United States Patent [19]

Krumm

[11] Patent Number: 5,584,494
[45] Date of Patent: Dec. 17, 1996

[54] FITTED RECUMBENT BICYCLE FRAME BUILDING PROCESS

[76] Inventor: Paul J. Krumm, 529 S. Chestnut St., Lindsborg, Kans. 67456

[21] Appl. No.: 454,434

[22] Filed: May 30, 1995

Related U.S. Application Data

[63] Continuation-in-part of Ser. No. 280,575, Jul. 25, 1994, Pat. No. 5,419,574.

[51] Int. Cl.⁶ .................................................. B62K 15/00
[52] U.S. Cl. ............................................................. 280/288.1
[58] Field of Search .................................. 280/278, 287, 280/288.1, 274, 281.1, 288.4

[56] References Cited

U.S. PATENT DOCUMENTS

| | | | |
|---|---|---|---|
| 2,482,472 | 9/1949 | Fried | 280/288.1 X |
| 4,333,664 | 6/1982 | Turner et al. | 280/288.1 X |
| 4,502,705 | 3/1985 | Weaver | 280/288.1 X |
| 4,647,060 | 3/1987 | Tomkinson | 280/288.1 |
| 4,786,070 | 11/1988 | Adee | 280/278 X |
| 4,925,203 | 5/1990 | Buckler | 280/278 |
| 5,403,027 | 4/1995 | Hwang | 280/278 X |

*Primary Examiner*—Kevin Hurley

[57] ABSTRACT

A process for building recumbent bicycles to fit their riders. The first step is to build an adjustable recumbent bicycle frame designed for adjustability in the location of all the major elements of the bicycle; including position and angle of seat, position of wheels and pedals or other foot power means, position and caster angle of steering axis and position of handlebars or other steering means. Then individual riders or classes of riders test the adjustable frame model, and work out configurations that fit their body build and style of riding. Finally, lighter weight less adjustable or non-adjustable bicycle frames are built, copying the measurements between the elements of the adjustable frame bicycle, as configured when tested. One unique aspect of the present invention is that the adjustable frame utilized provides for both vertical and longitudinal adjustment between the bicycle seat and the rear wheel. Thus this parameter can be ergonomically optimized. Then the positioning of the front wheel and its steering geometry can be optimized. Finally the position of the foot pedal mechanism and handlebars can be optimized for the rider with respect to the other components.

9 Claims, 5 Drawing Sheets

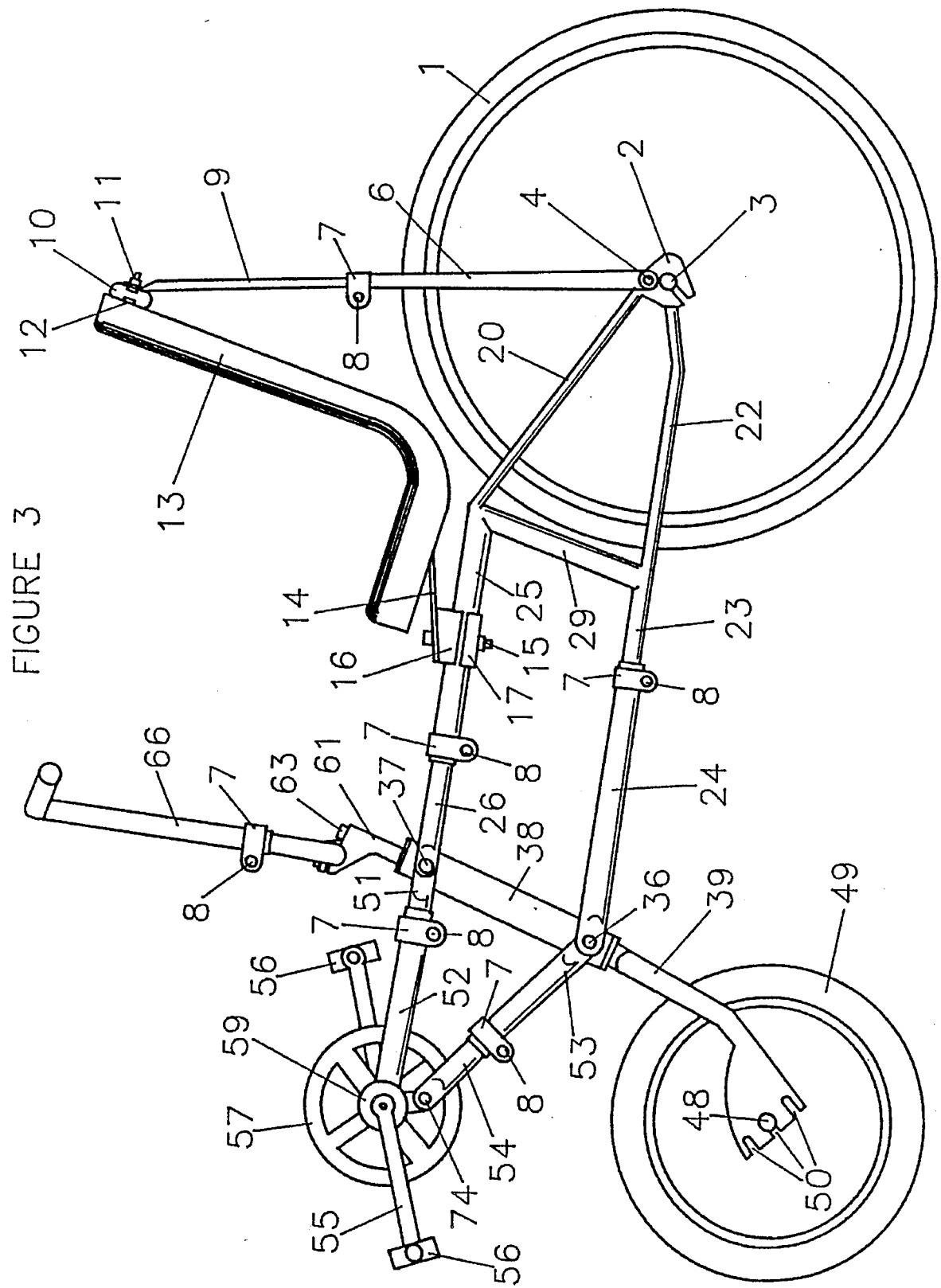

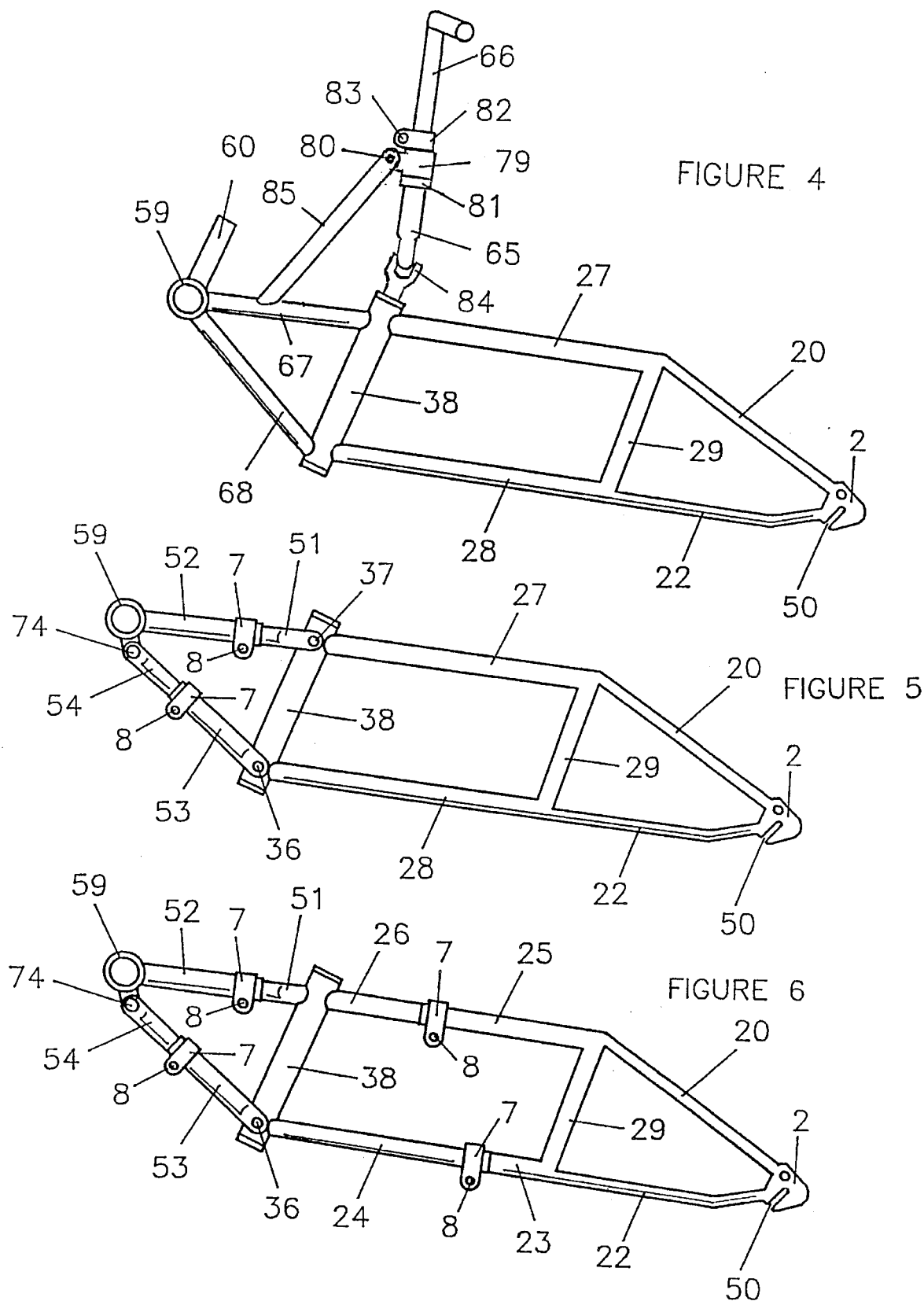

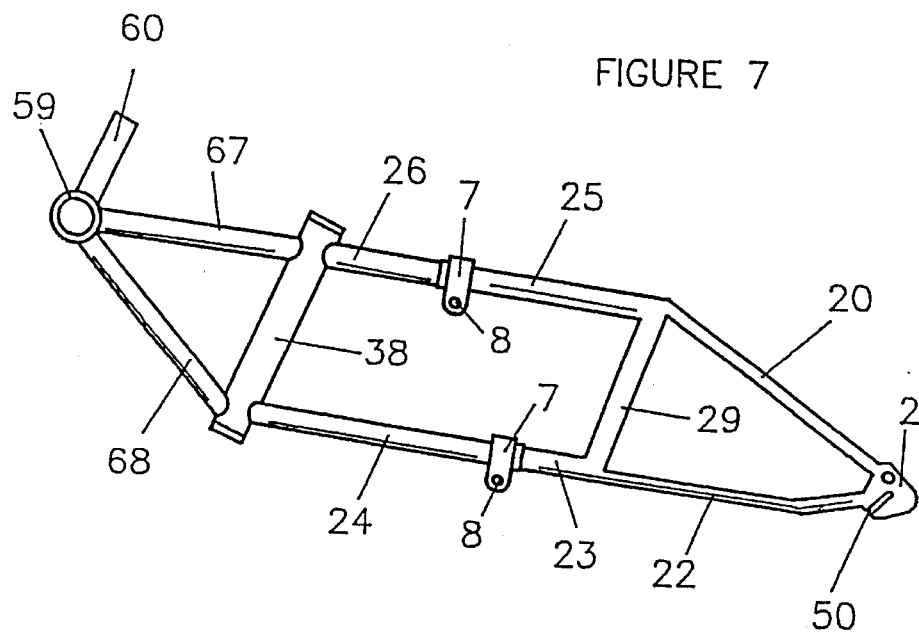
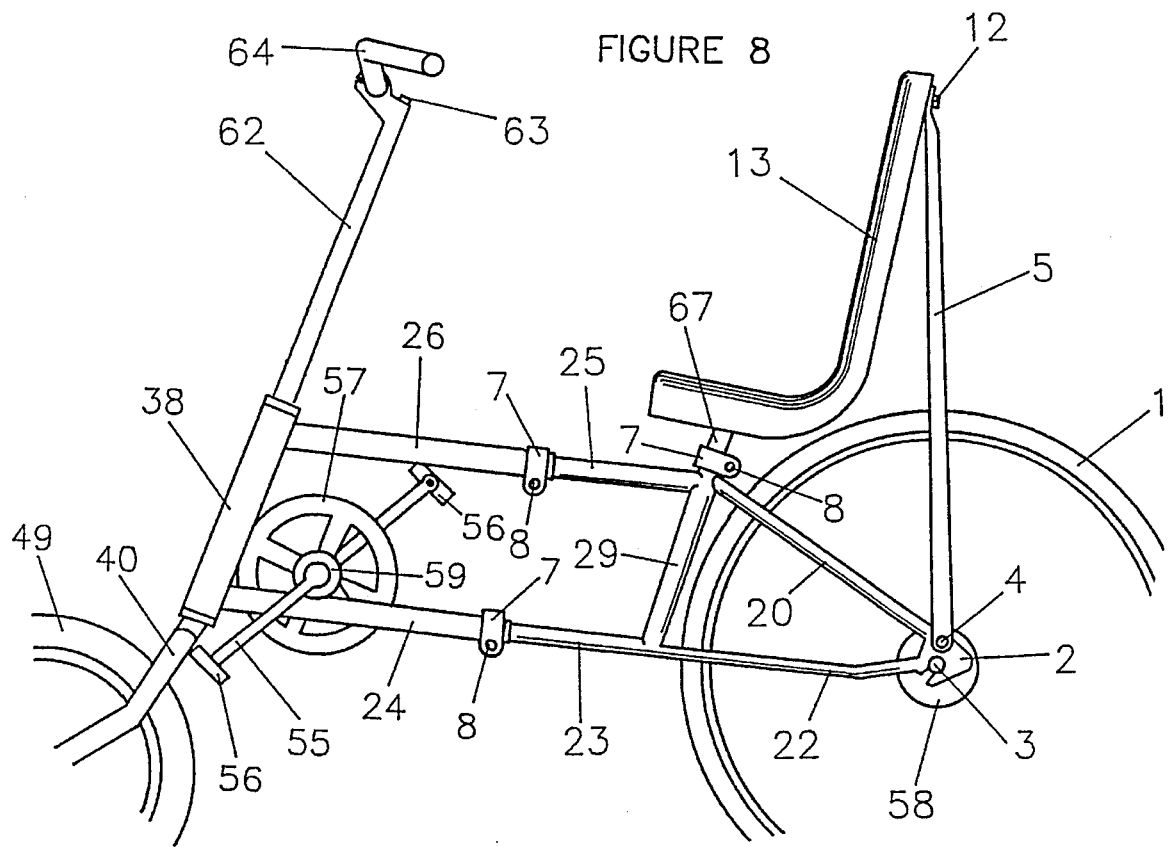

FITTED RECUMBENT BICYCLE FRAME BUILDING PROCESS

This is a continuation in part of application Ser. No. 08/280,575, filed Jul. 25, 1994, allowed as U.S. Pat. No. 5,419,574, issued May 30, 1995.

FIELD OF INVENTION

This invention relates to the manufacture of recumbent bicycles, specifically to such bicycles as are fitted to different sized riders and different riding conditions.

BACKGROUND-DESCRIPTION OF PRIOR ART

Most bicycles of today are of a sit-up diamond frame design. Numerous attempts have been made to introduce recumbent bicycle designs, with limited success, despite their potential advantages in comfort and ergonomically superior power utilization potential. While resistance to change has been one reason for limited success, another has been the difficulty working around the geometric limitations of the recumbent design itself, to design a bicycle that is practical, stable, safe, maneuverable, and easy to ride. There have been two general classes of solutions in the more common and comfortable feet forward position. One is the long wheel base solution, characterized by Jarvis' U.S. Pat. No. 690,733 of Jan. 7, 1902. The second is the short wheel base solution characterized by Fried, U.S. Pat. No. 2,482,472), Turner et. al (U.S. Pat. No. 4,333,664), and McElfresh, (U.S. Pat. No. 4,618,160).

Both of these general designs have been built with hand operated steering means (usually handlebars) below the rider's legs or above the rider's legs. While designs with steering means below the riders legs have come on the market, they have had limited market acceptance. It is the belief of the present inventor that riders feel safer with handlebars in front of them, especially in emergency situations.

A major design problem in the manufacture of recumbent bicycles has been that the positions of the basic components of the bicycle (wheels, seat, steering axis means, hand operated steering means, and foot operated power input means) need to be fitted to the individual rider. In diamond frame conventional bikes, the only components that are adjustable are the seat, and to a limited extent, the handlebars. Otherwise, one frame size fits a fairly wide variety of riders. A child who starts out on a conventional 20 or 24 inch wheel bike, can graduate directly to a 26 inch or 700 mm wheel adult bike of present manufacture. Only in expensive conventional bikes is frame size considered at all significant. Because of design constraints, a change of 1 or 2 inches in leg length can make a non-adjustable recumbent bicycle not fit its rider.

It is especially difficult to fit the short wheel base recumbents to different sized riders, and different riding conditions. The short wheelbase design is potentially much more maneuverable and easier to store than the long wheelbase configuration because of its smaller size. However its design is more complex and constrained. Its major components are especially constrained in their positions in order that they stay out of the way of each other and the rider while at the same time being configured to provide good rideability. Optimization of the interrelationships between these components has never been thoroughly researched because a thoroughly adjustable frame, allowing adjustment between all components, or each one with respect to all the rest heretofore never been provided.

In the adjustable frame semi-recumbent design of Buckler, (U.S. Pat. No. 4,925,203), the seat is adjustable with respect to the rest of the frame. However frame construction is such that seat position is taken as a variable, rather than a possible given, around which to adjust the rest of the frame. Adjustments of the seat relative to the rear wheel, its axle, and its ground contact patch, which patch lies directly below the axle, change the fore and aft weight balance of the machine, and therefore effect handling and riding quality.

In the present invention, the position of the seat can be set so that it just clears the rear wheel as it is moved upwardly and back, or forward and down. Its position with respect to the rear wheel can therefore be optimized according to use, and the positions of the remaining components adjusted to fit the rider. This makes it possible to minimize the length of the forward extension to the pedal assembly, and the total length of the bicycle, as well as to optimized geometry for rideability. While Buckler has rudimentary means to alter wheelbase and steering axis angle (by replacing parts) he does not provide any independent adjustment in pedal crank assembly position. Adjustments for rider leg length are made in the elements connecting the seat to the main frame member, moving the seat with respect to the rest of the frame. This is the only infinitely variable adjustment on the Buckler machine.

In addition, the Buckler bicycle is a semi-recumbent, not a true recumbent, as is the machine described herein. As such it is not designed so that the pressure created by pushing on the pedals is directly transferred to the seat back, as is the case on a true recumbent, such as the present design. With the Buckler machine, pedal pressure is counteracted by gravity and upward tension on the steering handlebars.

The recumbent frames of McElfresh (U.S. Pat. No. 4,618,160), Turner et al. (U.S. Pat. No. 4,333,664), and Fried (U.S. Pat. No. 2,482,472), all embody non-adjustable frame structures between the foot operated pedals and the rear wheel. Any adjustment for operator leg length on these designs compromises the position of the rider's center of gravity with respect to the rear wheel, a critical parameter in terms of rideability. Turner et al. and Fried provide no adjustments other than seat position. McElfresh provides means to adjust the distance between the seat and the front wheel steering axis, but he does not provide for, or teach in his specification, adjustment of the steering axis angle. This angle in fact changes as the front wheel assembly is moved along the frame in his design. In addition, all of his drawings show the imaginary upward extension of the steering axis to be well ahead of the rider's body and head, a poor choice for another very important design parameter that will be discussed in greater depth later.

The prior art recumbents that most resemble the present invention are unpatented. They include the ATP, the Presto, and the Lightning. These bicycles are provided with what is termed in the industry an adjustable boom, a single telescopic member that corresponds to the triangulated front extension of the present invention. While this configuration allows the frame to be adjusted to riders of differing leg length, it suffers from two limitations. First, the single member lacks the stiffness that is inherent in the triangulated structure of the present invention. Bicycles built in this way are notorious for their flexibility, an ergonometric deficiency, as well as a possible safety hazard. The earlier patents of Fried and Turner, et. al. for non-adjustable frames are specifically aimed at dealing with this deficiency. Secondly, prior art single adjustable boom bicycles lack the potential for vertical as well as horizontal adjustment of the foot power input means.

Recumbent bicycle seats are more complex than those of standard bicycles, because the seat has more than one function. On a standard diamond frame bike, the only function of the seat is to support the weight of the rider. On a recumbent there are two additional functions., The first is to support the back of the rider, and the second is to counteract the force of the rider's feet pressing on the pedals, which force is counteracted by pressure of the rider's hips against the lower seat back.

On a recumbent bicycle the hips must be supported from behind by means equal in strength to the toggle force produced by the straightening of the operator's legs against the pedals, which can be quite great. This force includes a well known torsional moment, caused by the fact that the pedals and the individual hips of the rider are off the centerline of the frame. This force is discussed by Fried and Turner et.al.

OBJECTS AND ADVANTAGES OF THE PRESENT INVENTION

The fitted recumbent bicycle frame building process relies on the use of an adjustable frame fitting bicycle with means to easily make adjustments between all of its major components, listed above, for ergonometric optimization. Important considerations include: The size of wheels, both front and rear; the relative position of the seat with respect to the rear wheel; the relative position of the front wheel and position and angle of the steering axis means to the rear wheel and seat; the relative position of the pedals and drive chain or other drive means to the front wheel, rear wheel, and seat; the relative position of the hand operated steering means to the rider and remaining components. It is only after testing hypotheses about stability and rideability with a completely adjustable design, that frame geometry for a recumbent bicycle that will fit each rider or class of riders and each use and style can be optimized.

DESIGN CONSIDERATIONS OF THE PRESENT INVENTION

Experimentation wish the adjustable frame recumbent bicycle has shown that the relationship between the rear wheel and the rider (both vertical and longitudinal position and pitch angle of the seat) is important and should be set, as a first step in fitting a rider or class of riders to a recumbent frame, according to the use anticipated and the size of the anticipated rider. For around town street use, a fairly erect, more rearward and higher seat position is appropriate. Where longer distance touring, or higher speed use is anticipated, a lower and more forward reclined position with the addition of a possible head rest is appropriate. The higher, more erect rearward position makes amount and dismount easier, increases visibility, and makes the necessary front extension for the pedal assembly shorter. The lower, more reclined position lowers frontal area, and wind resistance and augments high speed stability.

The size of front wheel chosen to some extent constrains the height of the pedal crank assembly, as clearance should be provided so that the rider's feet and legs do not impinge on the front wheel during turns. Some current production models do not provide this clearance, a safety hazard. If a larger e.g. 20 inch or larger front wheel is chosen, the pedals will be elevated further off the ground. If a smaller e.g. 16 inch or smaller front wheel is chosen, steering will be lighter and more sensitive, but pedal position will be lowered for easier mount and dismount, and rider comfort.

As the seat and rider are moved forward with respect to the rear wheel, more weight is placed on the front wheel. This makes a larger front wheel appropriate for its decreased rolling resistance, and better handling on rough surfaces under higher loadings. In present practice, both 16 and 20 inch front wheels have been used. Either standard 26 or 27 inch or 700 mm rear wheels are appropriate for bikes intended for adult use. Children's bikes would of course be proportionally smaller.

Other design considerations are as follows: the angle and position of the head tube steering axis means with respect to the seat and rider has been found to be critical to rideability. Specifically, as an imaginary line extended up thru the head tube, or steering axis, approaches the rider's mass, or at least the rider's head, the rider senses a feeling of separate entity atop an unwieldy thing. Therefore, as the front wheel is extended forward, the steering axis must be inclined more to keep its imaginary upper extension line aimed back toward the rider. The optimum position of the front wheel is far enough away from the rear wheel to provide a wheel base long enough so that steering is not too fast, but not so far forward so that excessive inclination in the steering axis is necessary to bring its imaginary extension line back toward the rider's center of mass, or at least the front of the rider's head.

Secondary to this setting, The lead of the front wheel axle in front of the imaginary downward extension line of the head tube steering axis means to the ground is another function that must be properly set. As the steering axis inclination is increased, the lead of the front wheel axis in front of the steering axis must be increased to maintain good steering characteristics. This is because the relationship between the ground contact patch of the front wheel (which lies at its perimeter below the front axle) and the imaginary extension of the steering axis to the ground is an important design parameter. In practice it has been found that if the imaginary line extending down from the steering axis is near the contact patch, optimum stability and rideability are achieved.

When the front wheel and its steering axis are properly aimed toward the rider's head, the steering means is likely to be too close to the rider's chest for riding comfort. It simply angled forward, the steering means moves thru a lateral arc in the direction of the turn during steering movement, giving a counter-intuitive feedback to the rider. When this is a problem, a universal joint is provided so that the steering means can be moved forward without the counter-intuitive lateral movement.

The position of the power input means (usually a pedal assembly) has two major constraints. The first, as mentioned earlier, is that the rider's feet and legs must clear the front wheel even as said front wheel turns on its steering axis. In long wheelbase designs, this requires that the front wheel must be far enough forward to clear the pedals and the rider's feet. As the wheel base is shortened, the pedal assembly must be moved upwardly for foot clearance over the front wheel. As the pedals are extended past the front wheel, they can again be lowered somewhat, provided the second constraint, the line of the drive chain or other drive means is taken into consideration. As an example, Turner et al, U.S. Pat. No. 4,333,664, use idler wheels near the steering axis to deal with this constraint.

The chain or other drive means also acts as a constraint on how far the rider's seat can be lowered. Here again there is a balance, now between rear wheel size and rolling resistance. Attempts to lower the rider's position to lower wind resistance by providing a smaller rear wheel are met with the increased rolling resistance of the smaller rear wheel. It is for this reason that present preferred practice is to use larger rear wheels. This could change if smaller wheels with low rolling resistance and good ridge characteristics could be provided.

DESCRIPTION OF THE DRAWINGS

FIG. 3 is a left side view of a somewhat simplified fitting frame.

FIG. 4 is a left side view of a simplified frame built following the process of the present application.

FIG. 5 is a left side view of a simplified frame that retains the adjustable front extension.

FIG. 6 is a left side view of and embodiment that retains reach bar adjustment and longitudinal adjustment of the power input means.

FIG. 7 is a left side view of an embodiment that retains reach bar length adjustment.

FIG. 8 is a left view of a long wheelbase design with the pedal assembly attached to the assembly made up of the head tube and forward section of the reach bars.

DETAILED DESCRIPTION OF THE PRESENT INVENTION

The adjustable frame of the fitting bicycle of the present invention utilizes, in new and novel ways, the type of slip joint used to adjust the height of the seat in present art diamond frame bicycles. The frame of the fitting bicycle consists of structural means which combine such slideable joints with transversely rotateable joints at their ends, which frame is adjustable in infinitely small increments in all salient ways.

Figure 1:
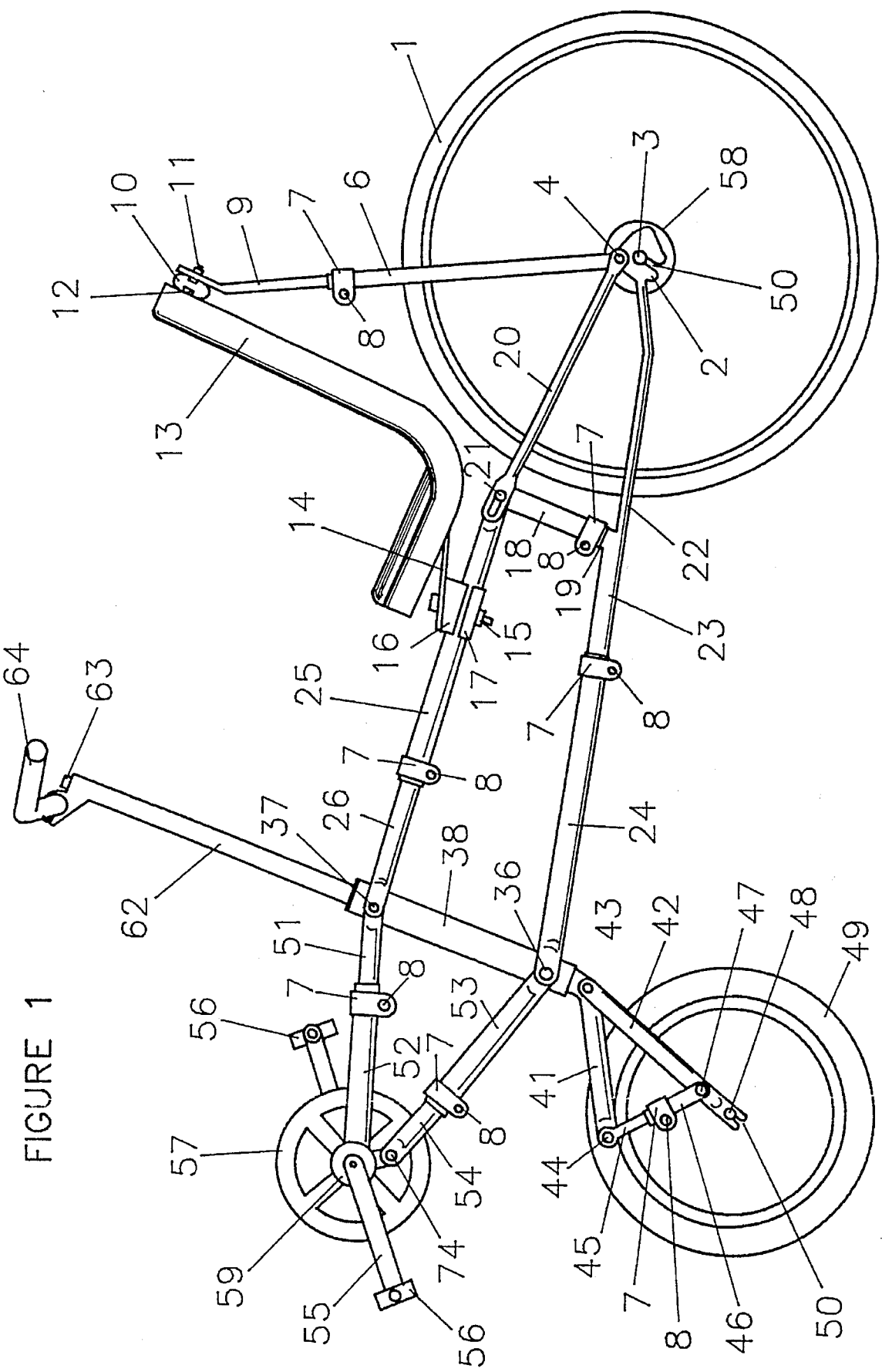
FIG. 1 is a left side view of one embodiment of the fitting bicycle of the present invention, showing adjustments made for a lower, more reclined rider's position.
Figure 2:
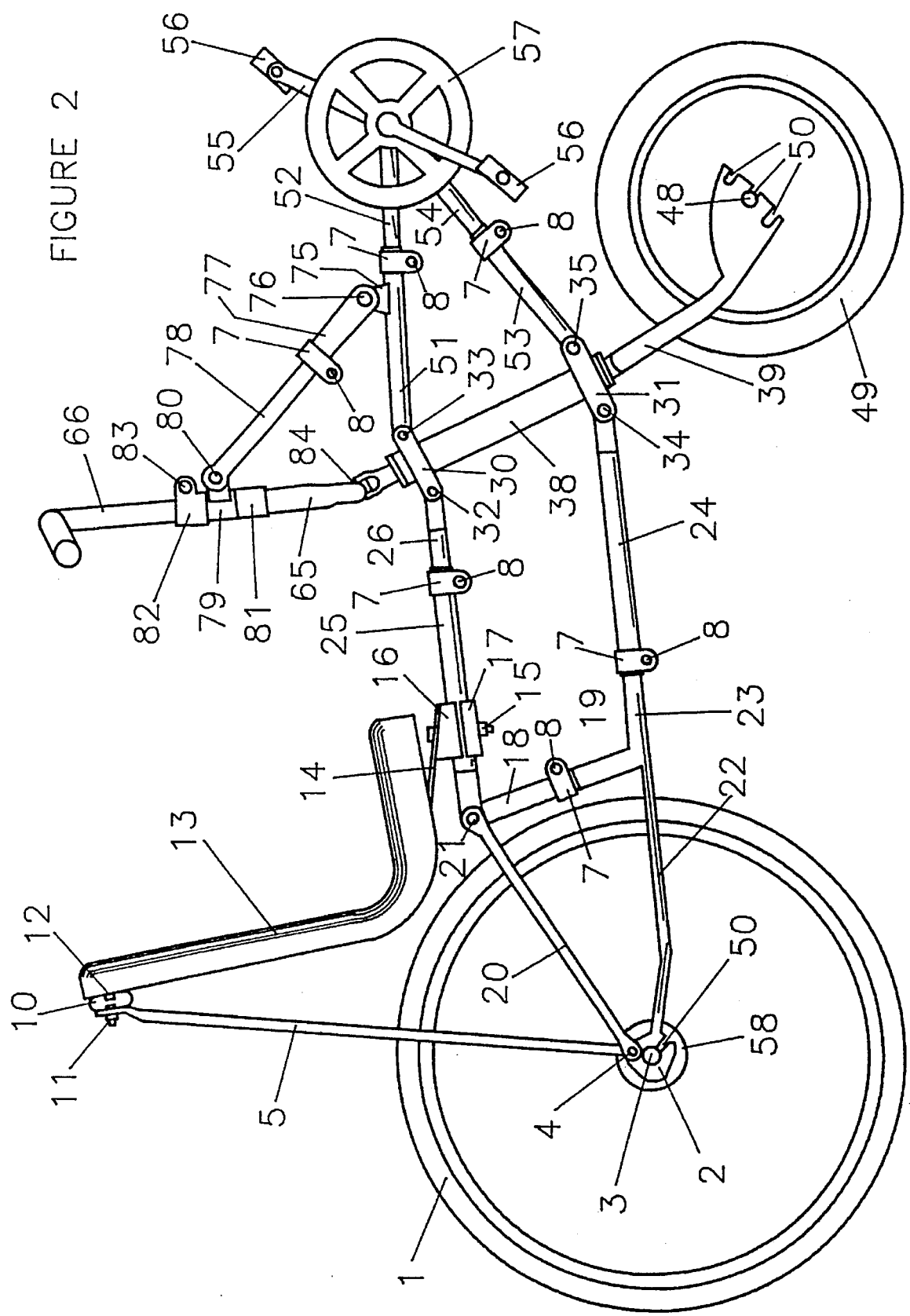
FIG. 2 is a right side view of a smaller embodiment, showing the seat in a more upright, rearward position.

Referring now to FIG. 1, the numeral 1 depicts the rear wheel and 2 depicts a pair of rear wheel support brackets that hold each end of said lower rear wheel stay is rigidly attached to the backend of the rear axle 3. Rear axle 3 is engaged by slots 50 in rear wheel supports 2. Rigidly attached to each rear fork wheel support bracket 20 is a lower rear wheel stay 22. The forward end of the rear section of lower reach bar 23, the bottom end of the bottom section of adjustable seat stay 19, and the second rear wheel stay 22. In FIG. 1 the bottom section of rear wheel stay 19 is mostly hidden, as it is slid inside top section 18. In FIG. 2 more of bottom section 19 is visible, as seat stay 18–19 is more extended.

Upper rear wheel stays 20 are rotateably attached to their respective rear fork wheel brackets 2 with bolts 4 so that they are free to change angle when the top section of adjustable seat stay 18 is slideably adjusted on the bottom section of the same seat stay, 19, previously described. This slideable adjustment allows the seat to be positioned at the height required. 7 depicts a typical clamping device and 8 depicts the clamp bolt that clamp the bottom and top sections of seat stay 18–19 together. Adjustable seat stay 18–19 is typical of the tubular links, slideably connected, that allow for the unique adjustments of the present invention.

Front and of upper rear wheel stay 20, upper end of top seat stay 18 and rear end of upper reach bar 25 are all attached together by bolt 21. Upper rear wheel stays 20 are slotted at the joint of bolt 21 to allow for minor changes in length of stays 20 as adjustable seat stay 18–19 is lengthened and shortened.

Seat 13, consisting of a seat base and a seat back, is provided to carry the rider. A simplified seat suspension/support system consists of seat bottom flat spring 14, and band spring 10. Flat spring 14 is rigidly attached to rear section of upper reach bar 25 with a clamping device consisting of top and bottom sections 16 and 17 which sandwich the upper frame reach bar with the aid of two pinch bolts 15. Flat spring 14 is rotateably attached to the underside of seat 13 on a transverse axis and flat band spring 19 is rigidly attached to both the top of the back of seat 13 and adjustable seat back stay 6–9. These springs both position the seat and suspend it, acting as linkages as well as springing devices.

It is important that seat bottom flat spring 14 be substantially parallel with a line from the center of pedal crank 55 to the base of seat 13. In this way the force of the rider's legs against pedals 56 is transferred thru it as a tensile force, in which direction it is very rigid, to the lower portion of the back of seat 13. If this spring is at too great an angle to the tensile force line, pedal pressure will cause unwanted vertical seat motion. The width of flat spring 14 (about two inches has been chosen in practice) also gives it rigidity against the yaw axis twisting forces noted in the description of prior art. At the same time spring 14 is flexible on a vertical axis, so it allows the seat to move up and down as the bicycle transverses bumps in the roadway.

Band spring 10 is attached to the top of the back of seat 13 with bolt 12 and to the top section of adjustable seat back stay 9 with bolt 11. Band spring 10 (in practice 0.030" to 0.080" thick and 0.675" to 1.5" wide) counteracts a small portion of the rearward pressure of the pedal force against the seat back, but since its moment arm against this force, which is exerted against the base of the seat back, close to flat spring 14, is long, its main function is to support the seat and rider on the pitch axis and prevent unwanted lateral movement of the top of the seat back, against which forces flat spring 14 has little rigidity.

Seat 13 forms one side of an adjustable triangle whose front bottom vertex is the seat base attachment, whose rear bottom vertex is bolt 4, and whose top vertex is seat back attachment bolt 12. The pitch or recline angle of the seat is set by adjusting the length of adjustable seat back stays 6–9. The longitudinal position of the seat is set by sliding seat bottom spring clamp 15–17 along rear section of upper reach bar 25. The height of the seat is set by the aforementioned adjustment of adjustable seat post 18–19. Said adjustable triangular structure replaces and obviates the need for the customary rigid frame structure placed behind the seat as in Jarvis' and other common designs. Since the top end of seat stay 6–9 is free to move both vertically and horizontally, The present adjustable triangular geometry has the additional advantage of greater flexibility of adjustment over such a rigid frame. An additional advantage is that the seat can be placed closer to the back wheel, since there is no frame member between seat 13 and rear wheel 1.

The angle and position of head tube (steering axis support means) 38 with respect to seat 13 and rear wheel 1 is set by adjustment of upper and lower reach bars 23–26. The upper reach bar comprises a front section 26 and a rear section 25, slideably attached by a clamp 7 and its pinch bolt 8. The lower reach bar comprises a front section 24 and a rear section 23, also slideably connected by a clamp 7 and pinch bolt 8. The front end of the front section of upper reach bar 26 is attached by a yoke and two bolts 37 (one on each side) to the upper end of steering axis support 38. Likewise the front end of the front section of lower reach bar 24 is attached by a yoke and two bolts 36 (one on each side) to the lower end of head tube 38. Independent elongation of the upper reach bar and the lower reach bar adjust the castor angle of steering axis support means 38.

Inserted in the top of head tube 38 is an elongated conventional gooseneck steering means support 62, attached by elongated conventional bolt 63. Attached to the top of gooseneck 62 is a hand operated steering means (handlebars) 64. Handlebars 64 allow the rider to control the direction of front wheel 49, and so to steer the bicycle.

The lead of front wheel 49 in front of the steering axis (as defined by the line extensions to the ground in FIG. 1) is set by adjusting front wheel frame structure (adjustable front fork) 41–47. Said front fork frame consists of twin reach members 41 which are rigidly attached to an inner rotating tube inside head tube 38, and are disposed either forward or behind the usual position of fork bars 42. Rotateably attached to the head tube end of fork reach bars 41 with bolts 43 are fork bars 42. Each fork bar 42 has at its lower extremity a front wheel support slot 50 for the engagement of the front wheel axle 48. The forward leading angle of fork bars 42 is set by adjusting the length of front fork adjusting links 44–47, again one on each side of front wheel 49. Said links consist of a front section 45 and a rear section 46. One end of each front fork adjustment link is attached to the extremity of each fork reach bar 41 with a bolt 44 and the other end is attached near the extremity of fork bar 42 with a bolt 47. Adjustment link bars 45 and 46 are themselves slideably attached by the use of a clamp 7 and pinch bolt 8.

Power for the bicycle is produced by the extension of the rider's legs. This power is made usable by a power input means attached to the bicycle frame. The conventional means of pedals and crank are the preferred embodiment for the present invention. The rear section of an adjustable upper front extension 51, and the front section of the same adjustable front extension 52, provide adjustment for the leg length of the rider, once the foregoing parameters have been set. At its rearward extremity, rear section 51 is transversely rotateably attached to the top of the steering axis support means 38. At its forward extremity, front section 52 is rigidly attached to power input support (crank bearing bracket) 59. The front section of lower front extension link 54 is rotateably attached to power input support 59, on a transverse axis, with bolt 74, as the angles of the triangle formed by head tube 38, upper front extension 51–52 and lower front extension 53–54 change during adjustment of the front extension assembly.

Crank bearing bracket 59 rotateably accepts pedal crank 55. Chain wheel(s) 57 and pedals 56 are mounted on crank 55 in the customary manner. Adjustment of lower front extension 53–54 sets the vertical position of the pedals. The normal setting for this parameter is such that the heels of the rider's feet just clear the front wheel when it is turned for steering. A conventional bicycle chain (not shown for simplicity) connects chain wheel(s) 57 and free wheel(s) 58 to transmit power from the pedals to the rear wheel in a conventional manner. It is understood that other foot operated power input means and other power transmission means known to the art could also be employed.

In the embodiment of FIG. 1 only one major frame joint is constrained rotateably. This is the joint between lower rear wheel stay 22, rear section of lower reach bar 23, and bottom section of seat stay 19. This joint has been held rigid because the chain power means would impinge on lower rear wheel stay 22 if the angle of the stay changed outside narrow limits. Also it is not necessary to articulate said joint in order to attain the necessary adjustability between components. While this joint could be articulated, a rigid joint at this point gives a reference around which other adjustments can be made.

A number of difference between the embodiments of FIGS. 1 and 2 should be noted, besides the differences in frame adjustment for a higher, more erect rider position. Firstly, FIG. 2 depicts a frame with a steering mechanism that is adjustable both vertically and along the longitudinal axis.

As noted before, it has been found that as the handlebar steering means are moved away from the axis of steering that steering rapidly deteriorates, especially when the handlebars are disposed in a position forward of the steering axis. Therefore longitudinal adjustment is provided via adjustable handlebar brace 77–78. Said brace is attached to the rear section of upper front extension 51 with boss 75 and bolt 76. The two sections 77 and 78 are slideably attached with a clamp 7 and clamp bolt 8. The upper end of the upper section of handlebar brace 78 is rotateably attached to the handlebar support 65 thru bearing 79 and bolt 80. Sleeve 81, rigidly attached to handlebar support 65, prevents bearing 79 from sliding down handlebar support 65. Sleeve clamp 82 prevents upward movement of bearing 79 and additionally positions handlebars 66 in their vertical position. Bearing 79, bolt 76 and universal joint 84 form the vertexes of a triangle. Adjustment of the length of brace 77–78 provides for longitudinal adjustment of handlebars 66 without their having to move thru a horizontal arc, which occurs without the aid of universal joint 84.

The second difference between FIGS. 1 & 2 is the mechanism to adjust the amount of lead on the front wheel fork 39. FIG. 1 shows an infinitely adjustable mechanism 41–47, while FIG. 2 shows a simpler, lighter, though more crude incrementally adjustable fork 39 with multiple slots 50. Slots 50 engage axle 48 of front wheel 49 in a conventional manner. Both these mechanism provide adjustable lead for the front wheel bearing in front on the head tube steering axis line.

Thus, as head tube 38 is inclined more or less, the imaginary line extending down through the head tube steering axis means to the ground can be adjusted with respect to the front wheel ground contact patch. As mentioned above this is necessary to maintain good rideability, as front wheel position and steering axis caster angle are adjusted.

Thirdly, in the embodiment of FIG. 2, seat back stay 5 is not adjustable in length. Fourthly, Attachment of reach bars 24 and 26 and front extensions 51 and 53 to head tube 38 are mediated by head tube attachment brackets 30 and 31 and bolts 32–35.

The fitting bicycle depicted in FIG. 3 does not have vertical seat adjustment, as seat stay 29 is not adjustable. However it does allow for forward and rearward movement of the seat, and adjustment of the seat recline angle by means of the adjustable seat back stay 6–9. Making the joint between seat stay 29, upper rear stay 20 and the rear section of upper reach bar 25 solid simplifies the frame, once this parameter is fixed. It might seem that there would be a problem in alignment as joints 36 and 37 are adjusted for different angles of head tube 38. In practice this has not been a problem as the frame members have sufficient flexibility to form themselves to the narrow changes in angle required.

Bicycles with all the above adjustments available in FIGS. 1, 2 and 3 tend to be heavy. They are valuable for testing, engineering and fitting purposes, to develop simpler designs that possess all the good riding characteristics mentioned earlier. Simpler designs, with less adjustments available, are more appropriate for production in large numbers. Light weight rigid frame bicycles, fitted to an individual rider or a class of rider's style, use, and size, engineered by first determining their configuration thru experimentation with the adjustable frame bicycle are additional marketable items.

FIG. 4 shows a simplified frame built as a result of the process of the present application. It differs from FIGS. 1, 2 and 3 in that it lacks any telescoping members or articulated joints. Seat post 29 is a single member rigidly attached. Adjustable reach bars are replaced by solid reach bars 27 and 28, rigidly attached at both their extremities. Upper and lower front extensions 67 and 68 are also of fixed length and rigidly attached to head tube 38 and power input support 59. Handlebar brace 85 is rigidly attached to upper front extension 67, but is bolted to bearing 79 for ease of assembly and alignment. A frame extension 60 in FIG. 4 provides for the attachment of a front derailleur.

FIG. 5 shows one configuration for a frame set up for a class of riders, but with adjustment for leg length and foot size thru the retention of adjustable front extension 51–54.

FIG. 6 depicts a partially adjustable configuration that allows for longitudinal movement of the pedal assembly, but no vertical movement. It also retains longitudinal adjustment of head tube 38 based on the firth and weight of the rider.

FIG. 7 shows a less desirable, but viable configuration in which only the reach bars are adjustable.

FIG. 8 shows an adjustable frame set up as a long wheelbase recumbent. In addition the bicycle of this diagram also has an unsprung seat, supported by a conventional seat post 67 and a non-adjustable seat back stay 5.

It is understood that other partially adjustable configurations are possible.

The preferred method for the process of setting up a frame for a specific rider or group of riders is as follows. The fitting frame is assembled and adjusted to a nominal size. Then the seat is positioned with respect to the rear wheel according to use, as outlined earlier in the specification. With rider input, the steering axis and front wheel are positioned with respect to the rear wheel/seat combination. Now, if not already done, the power input support is adjusted to fit the rider's leg length and shoe size, and chain length is adjusted if necessary. Handlebars are then positioned for comfort and rideability. The rider(s) then further test the bicycle, fine tuning all adjustments.

Once an adjustable frame is configured to fit a rider or class of riders, the adjustable portions are measured, and the measurements used to specify the manufacture of lighter weight but less adjustable frames or rigid frames that hold the major components of the bicycle in the same configuration. Techniques for measuring and duplicating frame geometry are well known to the art, and need not be discussed further here.

Based on the above description technological advances I makes claims as follows:

I claim:

1. A method of designing and manufacturing a recumbent bicycle ridden in a feet forward position, which fits a specific size of rider and style of riding, including the following steps:

a) providing a recumbent fitting bicycle which has an adjustable frame, which frame structure connects a rear wheel and a seat, said rear wheel including an axle, said axle providing attachment to said frame structure, said rear wheel being disposed in a ground contacting position for rolling movement, said seat comprising a bottom, a back, and frame attachment means, said seat being disposed in such a manner as to support said rider in a feet forward position, said seat being positioned substantially in the quadrant above and forward of said rear axle.

which frame structure also connects a foot operated power input means with the combination of said rear wheel and said seat, said power input means being disposed in a forward direction from said combination of said rear wheel and said seat, which frame structure provides a vertically triangulated front extension for said foot operated power input means, which frame structure additionally provides for a power transmission means to convey power from said power input means to said rear wheel, which frame structure also provides for the attachment of a front wheel steering axis means to rotationally connect a front fork and a front wheel to said frame, for steering movement of said front wheel, said front wheel including an axle, said axle providing attachment to said front fork, said front wheel being disposed substantially below said steering axis means and in front of said rear wheel in a ground contacting position for rolling movement, and which frame structure places a hand operated steering means in a convenient position for said rider, said steering means being connected to said steering axis means for rider control of steering movement of said front wheel, b: adjusting said bicycle frame structure to arrive at an optimum configuration of the bicycle components using rider input; said components comprising said rear wheel, said seat, said foot operated power input means, said steering axis means, said front wheel, and said steering means, c: measuring the dimensions between said components, held by said frame structure, in said optimum configuration, and, d: manufacturing a rigid bicycle frame which is lighter than the adjustable frame using the optimum measurements between components determined in step c.

2. The process of claim 1 wherein during step (b) at least one of the following is adjusted:

a substantially longitudinal movement of said rear wheel, a substantially longitudinal movement of said seat, a substantially vertical movement of said seat, a pitch angle of said seat, a substantially longitudinal movement of said front wheel steering axis means, a steering axis castor angle, a lead dimension of said axle of said front wheel in front of said steering axis, a substantially vertical movement of said steering means, a substantially longitudinal movement of said steering means, a substantially vertical movement of said foot operated power production means.

3. The process of claim 1 with the addition that during step (d) said frame of said bicycle produced also includes structural means for at least one of the following adjustments;

a substantially longitudinal movement of said rear wheel, a substantially longitudinal movement of said seat, a substantially vertical movement of said seat, a pitch angle of said seat, a substantially longitudinal movement of said front wheel steering axis means, a steering axis castor angle, a lead dimension of said axle of said front wheel in front of said steering axis, a substantially vertical movement of said steering means, a substantially longitudinal movement of said steering means, a substantially vertical movement of said foot operated power production means.

a substantially longitudinal movement of said foot operated power production means.

4. A method of designing and manufacturing a recumbent bicycle ridden in a feet forward position, which fits a specific rider and style of riding, including the following steps:

a: providing a fitting bicycle which has an adjustable frame, which frame has a seat support system, a rear wheel support means, a power input support means, and a steering axis support means, said steering axis support means rotateably supporting a front wheel frame, which has a front wheel support means, and is connected to a steering means support, said frame and said front wheel frame comprising the frame structure of said adjustable bicycle, which frame structure supports the following components; a steering axis means, a seat, a rear wheel, a front wheel, a hand operated steering means, and a foot operated power input means, said steering axis means mediating the connection between said frame and said front wheel frame, said seat comprising a bottom and a back and being disposed in such a manner as to carry a rider in a feet forward position, said rear wheel including a rear axle, said rear axle providing attachment of said rear wheel to said rear wheel support means, said rear axle being positioned substantially behind and below said seat, said rear wheel being disposed in a ground contacting position for rolling movement, said front wheel including a front axle, said front axle providing attachment to said front wheel support means, said front wheel being disposed substantially below said steering axis means and in front of said rear wheel in a ground contacting position for rolling movement, which frame structure places a hand operated steering means in a convenient position for said rider, said steering means being held by said steering means support, which support is connected to said front wheel frame for rider control of steering movement of said front wheel, said power input means being disposed in a forward direction from a combination of said rear wheel and said seat, at the forward end of a vertically triangulated front extension, which frame structure additionally provides for a power transmission means to convey power from said power input means to said rear wheel, b: adjusting the position of said power input support in a substantially longitudinal direction, using rider input, to provide said adjustable frame structure with an optimum configuration.

c: measuring the positions of said components when they are in said optimum configuration to obtain a set of optimum measurements, and, d: manufacturing a rigid frame having a weight which is less than that of said adjustable frame, using the optimum measurements determined in step (c).

5. The process of claim 4 wherein during step (b) at least one of the following is adjusted;

a longitudinal position of said rear wheel, a longitudinal position of said seat, a vertical position of said seat, a pitch angle of said seat, a longitudinal position of said front wheel steering axis means, a steering axis castor angle, a lead dimension of said axle of said front wheel in front of the steering axis, a vertical position of said steering means, a longitudinal position of said steering means, a vertical position of said foot operated power production means.

6. The process of claim 4 within the addition that during step (d) said frame of said bicycle produced also includes structural means for at least one of the following adjustments;

a longitudinal position of said rear wheel, a longitudinal position of said seat, a vertical position of said seat, a pitch angle of said seat, a longitudinal position of said front wheel steering axis means, a steering axis caster angle, a lead dimension of said axle of said front wheel in front of the steering axis, a vertical position of said steering means, a longitudinal position of said steering means, a vertical position of said foot operated power production means.

a longitudinal position of said foot operated power production means.

7. A method of designing and manufacturing a recumbent bicycle arranged to be ridden in a feet forward position, which fits a specific size of rider and style of riding, including the following steps:

a: providing a fitting bicycle which has an adjustable frame, which frame supports the major components of said bicycle, said components comprising a rear wheel, a front wheel, a seat, which seat includes a bottom and a back, a steering axis means, a hand operated steering means, and a foot operated power input means, b: adjusting said bicycle frame structure to arrive at an optimum configuration between a combination of said rear wheel and said seat on the one hand, and said power input means on the other hand, using rider input;

c: measuring the dimensions between said components, held by said frame structure, in said optimum configuration, and, d: manufacturing a rigid bicycle which is lighter than said adjustable fitting bicycle using the optimum measurements between components determined in step c.

8. The process of claim 7 wherein during step (b) at least one of the following is adjusted:

a longitudinal position of said rear wheel, a longitudinal position of said seat, a vertical position of said seat, a pitch angle of said seat, a longitudinal position of said front wheel steering axis means, a steering axis castor angle, a lead dimension of said axle of said front wheel in front of said steering axis, a vertical position of said hand operated steering means, a longitudinal position of said hand operated steering means, a vertical position of said foot operated power input means.

9. The process of claim 7 with the addition that during step (d) the frame of the bicycle produced also includes structural means for at least one of the following adjustments;

a longitudinal position of said rear wheel, a longitudinal position of said seat, a vertical position of said seat, a pitch angle of said seat, a longitudinal position of said front wheel steering axis means, a steering axis castor angle, a lead dimension of said axle of said front wheel in front of the steering axis, a vertical position of said hand operated steering means, a longitudinal position of said hand operated steering means, a vertical position of said foot operated power input means, a longitudinal position of said foot operated power production means.

* * * * *